Oct. 19, 1926.
R. V. JERNBERG
ADJUSTABLE SAFETY AIR GAUGE
Filed Nov. 10, 1924
1,603,469
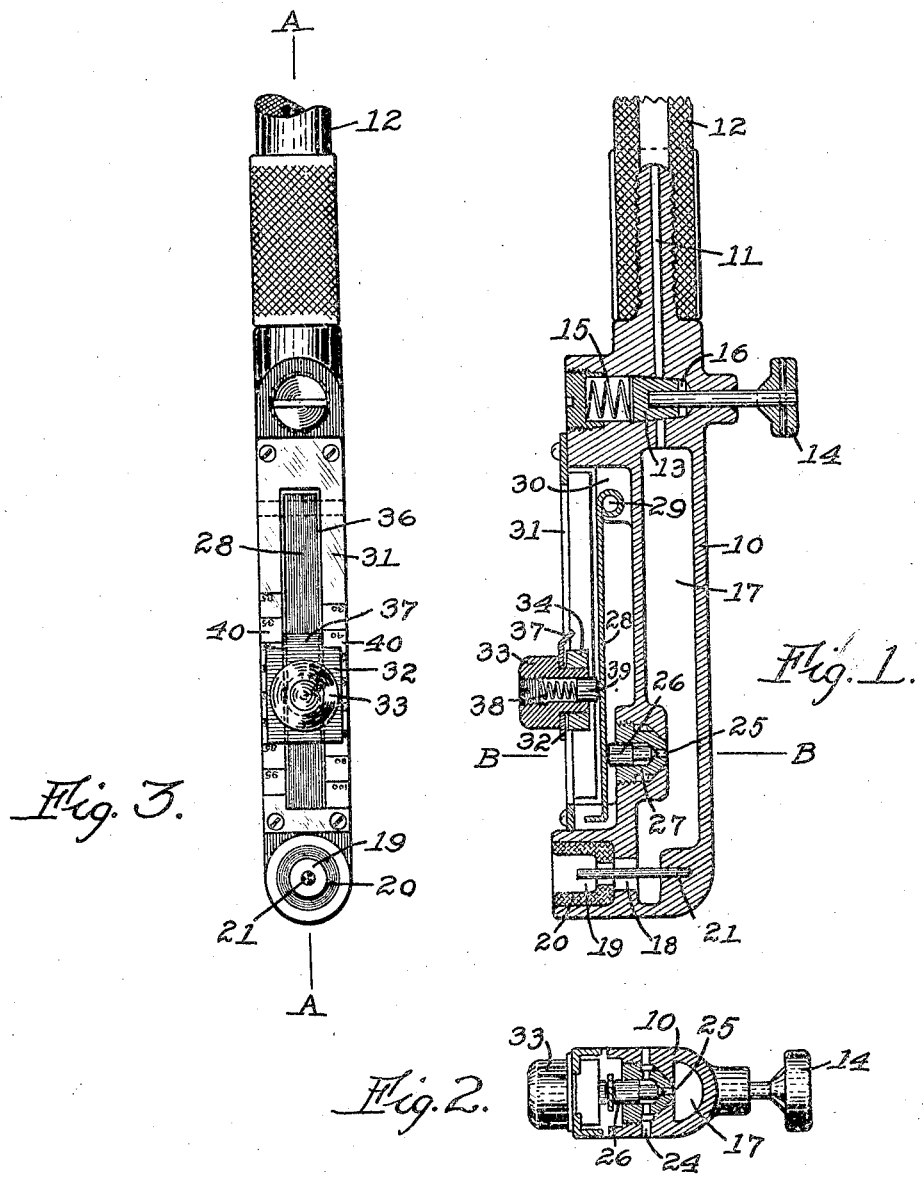
Ralph V. Jernberg
INVENTOR.
BY
Southgate Fay & Hawley
ATTORNEYS Patented Oct. 19, 1926.

1,603,469

UNITED STATES PATENT OFFICE.

RALPH V. JERNBERG, OF WORCESTER, MASSACHUSETTS, ASSIGNOR OF ONE-HALF TO FREDERICK R. WILLIAMS, OF WORCESTER, MASSACHUSETTS.

ADJUSTABLE SAFETY AIR GAUGE.

Application filed November 10, 1924. Serial No. 748,861.

This invention relates to an air gauge for use in filling tires although it is capable of use in any analogous situation.

The pincipal object of the invention is to provide an air gauge which can be set so that when the tire is blown up to a certain pressure a by-pass will be connected automatically so that a signal will be given to announce the fact that the predetermined pressure in the tire has been reached; to arrange this by-pass in such a manner with relation to the air supply that it can be depended on to act correctly under all conditions and never act as an injector; to provide means for choking the flow of air for the same reason; and further to provide this device in such form that it can be adjusted accurately and permanently in a most simple manner to indicate the pressure for which it is set.

The invention also involves a construction by which these advantages are secured with a minimum of parts and with no parts that are likely to get out of order in use.

Reference is to be had to the accompanying drawing in which

Fig. 1 is a longitudinal sectional view on the line A—A of Fig. 3 of an air gauge constructed in accordance with this invention;

Fig. 2 is a section thereof on the line B—B of Fig. 1; and

Fig. 3 is a bottom plan view showing the scale.

I have shown the invention in a form comprising a casing 10 having an inlet 11 for connection with a supply hose 12 or the like. The conical passage through the inlet is controlled by a valve 13 having a stem and head 14 for pressing it down against the resistance of a spring 15 to bring a passage 16 in the valve into registration with the inlet passage. In this way the air is admitted to a chamber 17 in the casing 10. This valve does not open widely but merely affords a passage around the valve that cannot be enlarged greatly or quickly. It acts as a choker to prevent a sudden rush of air into the chamber 17. This chamber delivers through a port 18 into a socket 19 which is lined with rubber 20 and fits on the valve of the tire to deliver air thereto. It is provided with a pin 21 for operating the tire valve as usual.

The chamber 17 is provided with a port 25 closed by a freely reciprocating valve 26 located in a nozzle 27 for the purpose of allowing the air to escape from the chamber 17 through by-pass ports 24 when the pressure in the tire has reached a certain predetermined amount. The chamber 17 is made large so that there will be no sudden rush of air past the port 25 which would hold the valve 26 firmly to its seat by suction, on account of acting like an injector. This is an important feature and cooperates with the choke valve 13 for this purpose. For this purpose I provide a flat bar 28 which is pivoted on a cross pin 29 and extends longitudinally of the casing 10 in a socket or depression 30 therein. This spring is adapted to engage the butt end of the valve plunger 26 for the purpose of holding it to its seat with whatever degree of pressure is permitted by the adjustment now to be described.

On the open side of the depression 30 is a guide frame 31. On this there is a slide 32 formed of sheet metal and having a button 33 on the outer side and a washer 34 on the inner side so that it is capable of sliding on this frame which is provided with a longitudinal slot 36. The longitudinal parts of this frame at the sides of this slot constitute the guides and the slide 32 has tongues 37 projecting down into the slot 36 and fitting the same so that the slide will be properly guided. Inside the button and slide is a spring 38 pressing on a plunger 39 which bears against the bar 28. The pressure of the spring 28 is adjusted by a screw plug 40 in the end of the button 33 so that the calibration can be made substantially exact and permanent. This slide is moved along the guide by means of the button so that the plunger 39 engages the bar 28 at different distances from its pivotal point of support. Consequently it causes the bar to bear with different degrees of pressure on the plunger 26. I have shown a scale 40 along the two sides of the guide 31 indicating the pressure at which the valve 26 will be opened so as to afford a by-pass into the open air from the chamber 17.

It will be seen therefore that the slide can be set in such position as to insure the filling of the tire up to any desired pressure and that when that pressure is reached a by-pass is automatically connected to prevent much more air entering the tire and at the same time giving a signal by the issue of the air through the ports 24. In this way the filling of the tire with air up to any desired pressure is a very simple matter and there is no danger of filling it to too high a pressure. Therefore no time is lost in letting air out. Furthermore, there is no necessity of disconnecting the parts and testing the pressure in the tire and then connecting them again. In this way considerable time is saved and the tires are filled accurately to the desired pressure instead of the pressure getting too high as is very frequently the case.

Although I have shown and described the invention as used for filling tires it will be obvious that it can be employed for the purpose of filling ballons or any other article with air, gas or vapor in order to limit and control the pressure within the article.

Although I have illustrated and described only a single form of the invention I am aware of the fact that modifications can be made therein by any person skilled in the art without departing from the scope of the invention as expressed in the claims.

Therefore I do not wish to be limited to all the details of construction herein shown and described but what I do claim is:—

1. In a device of the character described, the combination with a casing provided with a chamber having a restricted inlet with a choke valve therein for admitting compressed air, gas or the like and an outlet for delivering it, the chamber having a by-pass port and being large enough to avoid the creation of suction inwardly at the by-pass port, by the flow of air past the port, a valve for normally closing said port, yielding means for holding the valve closed, and adjustable yielding means movable along the casing for regulating the pressure exerted on said valve.

2. In a device of the character described, the combination of a casing having a large chamber for compressed gas or the like, a restricted inlet having a choke valve therein, and means for delivering the air, said chamber having a port through which the contents of the chamber can escape to the outer air, a valve for normally closing said port, a flat spring pivoted at one end and engaging the valve to close it, a guide on the side of the casing, a slide on the guide, finely adjustable means carried by the guide and adapted to engage said spring at different distances from its pivot to hold it against the valve, and a scale along the guide to show what pressure of gas inside the chamber will be required to displace the valve from its seat in any position of the slide.

In testimony whereof I have hereunto affixed my signature.

RALPH V. JERNBERG.